United States Patent
Saitoh

(10) Patent No.: US 8,061,044 B2
(45) Date of Patent: Nov. 22, 2011

(54) POWER TOOL WITH CHIPS EJECTING MECHANISM

(75) Inventor: Hiroyuki Saitoh, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 327 days.

(21) Appl. No.: 12/032,072

(22) Filed: Feb. 15, 2008

(65) Prior Publication Data

US 2008/0209739 A1    Sep. 4, 2008

(30) Foreign Application Priority Data

Feb. 15, 2007  (JP) ................................ P2007-035231
Sep. 28, 2007  (JP) ................................ P2007-256868

(51) Int. Cl.
*B27B 9/00* (2006.01)
(52) U.S. Cl. ............. 30/391; 30/124; 83/98; 144/252.1; 285/7
(58) Field of Classification Search .............. 30/124, 30/125, 388, 390, 391, 456; 83/98, 100, 83/168, 473, 477.2, 478, 581; 144/252.1, 144/252.2; 285/7, 146.1, 148.1, 148.19, 285/148.22, 148.4, 148.5
See application file for complete search history.

(56) References Cited

U.S. PATENT DOCUMENTS

| 1,833,785 | A | * | 11/1931 | Krieger | 83/98 |
| 2,103,050 | A | * | 12/1937 | White | 285/7 |
| 2,203,088 | A | * | 6/1940 | Hansson | 285/7 |
| 2,710,204 | A | * | 6/1955 | Faith-Ell | 285/7 |
| 5,167,215 | A | * | 12/1992 | Harding, Jr. | 125/13.01 |
| 5,927,171 | A | * | 7/1999 | Sasaki et al. | 83/165 |
| 6,219,922 | B1 | * | 4/2001 | Campbell et al. | 30/124 |
| 6,557,261 | B1 | * | 5/2003 | Buser et al. | 30/124 |
| 6,748,660 | B2 | * | 6/2004 | Buser et al. | 125/12 |
| 6,827,640 | B2 | * | 12/2004 | Bures et al. | 451/456 |
| 6,935,939 | B1 | * | 8/2005 | Buser et al. | 451/451 |
| 7,465,328 | B2 | * | 12/2008 | Trautner et al. | 55/385.1 |
| 7,526,866 | B2 | * | 5/2009 | Schnell et al. | 30/124 |
| 2005/0103172 | A1 | * | 5/2005 | Bohne et al. | 83/168 |
| 2008/0178479 | A1 | | 7/2008 | Bohne | |

FOREIGN PATENT DOCUMENTS

| CN | 2191073 | | 3/1995 |
| CN | 1658994 | A | 8/2005 |
| DE | 20119604 | | 4/2004 |
| WO | 03103883 | | 12/2003 |

OTHER PUBLICATIONS

Chinese Office Action, w/ English translation thereof, issued in Chinese Patent Application No. CN 200810008229.4 dated Nov. 13, 2009.

* cited by examiner

*Primary Examiner* — Edward Landrum
(74) *Attorney, Agent, or Firm* — McDermott Will & Emery LLP

(57) ABSTRACT

A power tool is disclosed, which includes a tip tool driven by an electric motor, a main body for supporting the tip tool and a dust nozzle which is provided to the main body and to which a dust bag or a dust hose is connectable. When the dust nozzle is aligned in a first direction, the dust nozzle is rotatable with respect to the main body around the first direction as a rotation center. When the dust nozzle is inclined with respect to the first direction from a first position to a second position, the dust nozzle is not rotatable around the first direction.

7 Claims, 10 Drawing Sheets

A-A

A'-A'

A"-A"

POWER TOOL WITH CHIPS EJECTING MECHANISM

CROSS-REFERENCE TO RELATED APPLICATIONS

This application is based on and claims the benefit of priority from the prior Japanese Patent Applications No. 2007-035251, filed on Feb. 15, 2007 and No. 2007-256868 filed on Sep. 28, 2007; the entire contents of which are incorporated herein by reference.

TECHNICAL FIELD

The present invention relates to a power tool for collecting chips generated during a cutting work, or the like by a dust hose or a dust bag of a dust collector, or the like connected to the power tool.

BACKGROUND

By way of example of the power tool in the related art, a portable circular saw will be explained with reference to FIG. 5, FIG. 6, and FIG. 7 hereunder.

As shown in FIG. 7, the portable circular saw has a main body 1 and a base 3. The main body 1 is provided to the base 3 such that it can turn on a turn pivot 23. A turn adjusting knob 22 engages with a hole portion 21a provided to a depth adjusting plate 21 that is secured to the base 3. This turn adjusting knob 22 can fix the main body 1 to the base 3 in any position of the hole portion 21a. The portable circular saw is constructed such that, when a worker operates a trigger switch after an electric power is fed, an electric motor (not shown) starts to rotate, and then transmits its rotation to a saw blade 2 to cut a worked material.

As shown in FIG. 5, when the base 3 is slid forward (front) in FIG. 5 on the worked material (not shown), the saw blade 2 placed to project from the base 3 cuts the worked material (not shown). In cutting the worked material, the chips as a part of the worked material being cut by the saw blade 2 are produced.

As the mechanism for collecting the chips, there is such a mechanism that, as shown in FIG. 5, a dust nozzle 66 is coupled to a top portion of a saw cover 55 and then a chip recovering means as a dust hose 9 of the dust collector (not shown) is fitted to the dust nozzle 66. The chips when sucked by the dust collector (not shown) moves from the saw cover 55 to the dust nozzle 66, and are collected by the dust collector via the dust hose 9.

In FIG. 6, a dust bag 10 is fitted to the dust nozzle 66. In this case, a force of scattering the chips is applied to the chips by the saw blade 2 in the direction of a fitting axis X of the saw cover 55. Therefore, the chips enter into the dust nozzle 66 from the saw cover 55 by its own scattering force, and then enter into the dust bag 10. As a result, the chips are collected by the dust collector.

The dust nozzle 66 shown in FIG. 5 and FIG. 6 is provided to turn on the fitting axis X of the saw cover 55 along a groove provided in the circumferential direction of the saw cover 55. This fitting axis X of the saw cover 55 also acts as a fitting axis of the dust nozzle 66. In the cutting work by the portable circular saw, the worker can turn the dust hose 9 and the dust bag 10 together with the dust nozzle 66 in any direction.

In this case, as shown in FIG. 5 or FIG. 6, an angle α between the fitting axis X of the saw cover 55 and a fitting axis Y of the dust hose 9 or the dust bag 10 is always kept constant, and is set to about 45 degree, for example. Also, although not shown, the fitting axis Y of the dust bag 10 or the dust hose 9 is identical to the fitting axis X of the saw cover 55, and is set to about 0 degree, for example.

SUMMARY

In the configuration in related art, as shown in FIG. 6, when the dust bag 10 is fitted as the chip recovering means, an angle α between the fitting axis X of the saw cover 55 and the fitting axis Y of the dust hose 9 or the dust bag 10 was set to about 45 degree.

As shown in FIG. 6, a chip storage portion 10a in the inside of the dust bag 10 can be represented as a portion that is encircled by a dotted line and a periphery of the dust bag 10. The chips are stored in the dust bag 10 at sixty or seventy percent at most, as illustrated in FIG. 6, and therefore it is impossible to accumulate sufficiently the chips cut by the saw blade 2, or the like in the dust bag 10. This is because the chips that have been stored once in the dust bag 10 are brought into the saw cover 55 from the dust bag 10 through the dust nozzle 66 by a gravity applied in the vertical direction.

For this reason, there was such a situation that the chips return from the dust bag 10 to the saw cover 55, and are accumulated in the inside of the saw cover 55 to bring about degradation in workability.

Also, as shown in FIG. 5, when the dust hose 9 is used, an angle α between the fitting axis Y of the dust hose 9 and the fitting axis X of the saw cover 55 must be kept at about 45 degree. The reason for this is that the dust hose 9 must be kept away to some extent from the portable circular saw by setting such angle to about 45 degree not to hinder in the cutting work.

Also, although not shown, in some case the fitting axis Y of the dust bag 10 or the dust hose 9 is set identically to the vertical axis X. In such case, when the chips are collected by using the dust bag 10, such chips can be hardly stored in the dust bag. Also, when the chips are collected by using the dust hose 9, the dust hose 9 acts as a hindrance in the work.

Also, as shown in FIG. 7, there is the portable circular saw of a type an amount of projection of the saw blade 2 from the base 3 can be adjusted small by turning the main body 1 on a turn pivot 23. In such case, an angle between an axis Z in the vertical direction and the fitting axis Y of the dust bag 10 is changed into an angle β. In this case, as shown in FIG. 7, the chips that have been stored once in the dust bag 10 are brought into the saw cover 55 from the dust bag 10 through the dust nozzle 66 by a gravity applied in the vertical direction. Therefore, the chip storage portion 10a is reduced smaller than the area shown in FIG. 6, and thus a smaller mount of chips can be accumulated in the dust bag 10.

Means for Solving the Problems

It is an object of the present invention to provide a power tool capable of collecting a larger amount of chips in an inside of a dust bag when the dust bag is fitted.

Also, it is another object of the present invention to provide a power tool capable of stimulating much more conveyance of the chips from a dust nozzle 6 to a dust bag 10 or a dust hose 9.

Also, it is still another object of the present invention to provide a power tool applicable preferably to either of a dust bag 10 and a dust hose 9.

Also, it is yet another object of the present invention to provide a power tool that is equipped with a main body with a tip tool and a base such that the main body can be turned with respect to the base in a cutting direction, and can prevent a reduction in a storage mount of chips in a dust bag when an angle between an axis X in the vertical direction and a fitting axis Y of the dust bag is made small after the main body is turned with respect to the base.

The above objects can be achieved by providing a power tool, which includes an electric motor; a tip tool driven by the electric motor; and a main body for supporting the electric motor and the tip tool; wherein a dust nozzle is provided to the main body, and is able to incline from a first position to a second position.

ADVANTAGES OF THE INVENTION

According to the present invention, the dust nozzle can be inclined from a first position to a second position. Therefore, a storage amount of the chips in the dust bag 10 can be increased.

Also, the dust nozzle 6 can be turned on the fitting axis X of the saw cover 5 that also acts as the fitting axis of the dust nozzle 6. Therefore, the worker can turn the dust bag 10 and the dust hose 9 on the fitting axis to a desired position in the circumferential direction. As a result, workability can be improved.

Also, the turn of the dust nozzle can be restricted. Therefore, it can be suppressed that the dust nozzle is moved inadvertently in cutting the worked member.

Also, the turn can be restricted by the inclination of the dust nozzle. Therefore, it can be suppressed that the dust nozzle is unexpectedly moved while keeping a state that a large amount of chips can be stored in the dust bag 10.

Also, the power tool has the saw blade in which the tip tool is supported rotatably, the main body has the saw cover that is shaped to cover partially the outer periphery of the saw blade, and the dust nozzle is provided to the saw cover. Therefore, when an angle from the vertical direction to the fitting axis of the dust bag is 0 degree, the worker can incline the fitting axis of the dust bag in collecting the dust and thus a large amount of chips can be stored in the dust bag 10. The dust hose 9 never interferes with the cutting work.

Also, the direction of inclination from the first position to the second position is parallel with a side surface of the saw blade. Therefore, the dust bag 10 or the dust hose 9 can be inclined backward in the direction in which the chips are scattered by the cutting. As a result, the chips can be caused to enter easily into the dust bag 10 or the dust hose 9.

Also, when the dust bag 10 is used to collect the dust, the direction of inclination from the first position to the second position is substantially parallel with the side surface of the saw blade. Therefore, when the fitting axis Y of the dust bag 10 is inclined from the first position to the second position Y', a larger amount of chips can be stored in the dust bag 10.

Also, the power tool has the main body with the tip tool and the base, and the main body can be turned on the base in the cutting direction. Therefore, when the main body is turned with respect to the base, an angle from the vertical direction to the fitting axis of the dust bag is decreased from an angle α to an angle β, as shown in FIG. 7. In this case, when the dust nozzle is inclined, an angle between the axis in the vertical direction and the fitting axis of the dust bag can be increased. As a result, a larger amount of chips can be stored in the dust bag 10.

BRIEF DESCRIPTION OF THE DRAWINGS

In the accompanying drawings.

DESCRIPTION OF THE EMBODIMENTS

As shown in FIG. 1 to FIG. 7, the front and the rear in the cutting direction are defined as the forward side (front) and the backward side (rear) respectively in all Figures. Here, in all Figures, the right side is the forward side (front) and the left side is the backward side (rear). Also, in FIG. 1 to FIG. 3 and FIG. 5 to FIG. 7, the upper side and the lower side are defined as the upward side (up) and the downward side (down) respectively. In this case, the direction in which the forward side and the backward side are connected is the longitudinal direction, and the direction in which the upward side and the downward side are connected is the vertical direction.

Figure 2:
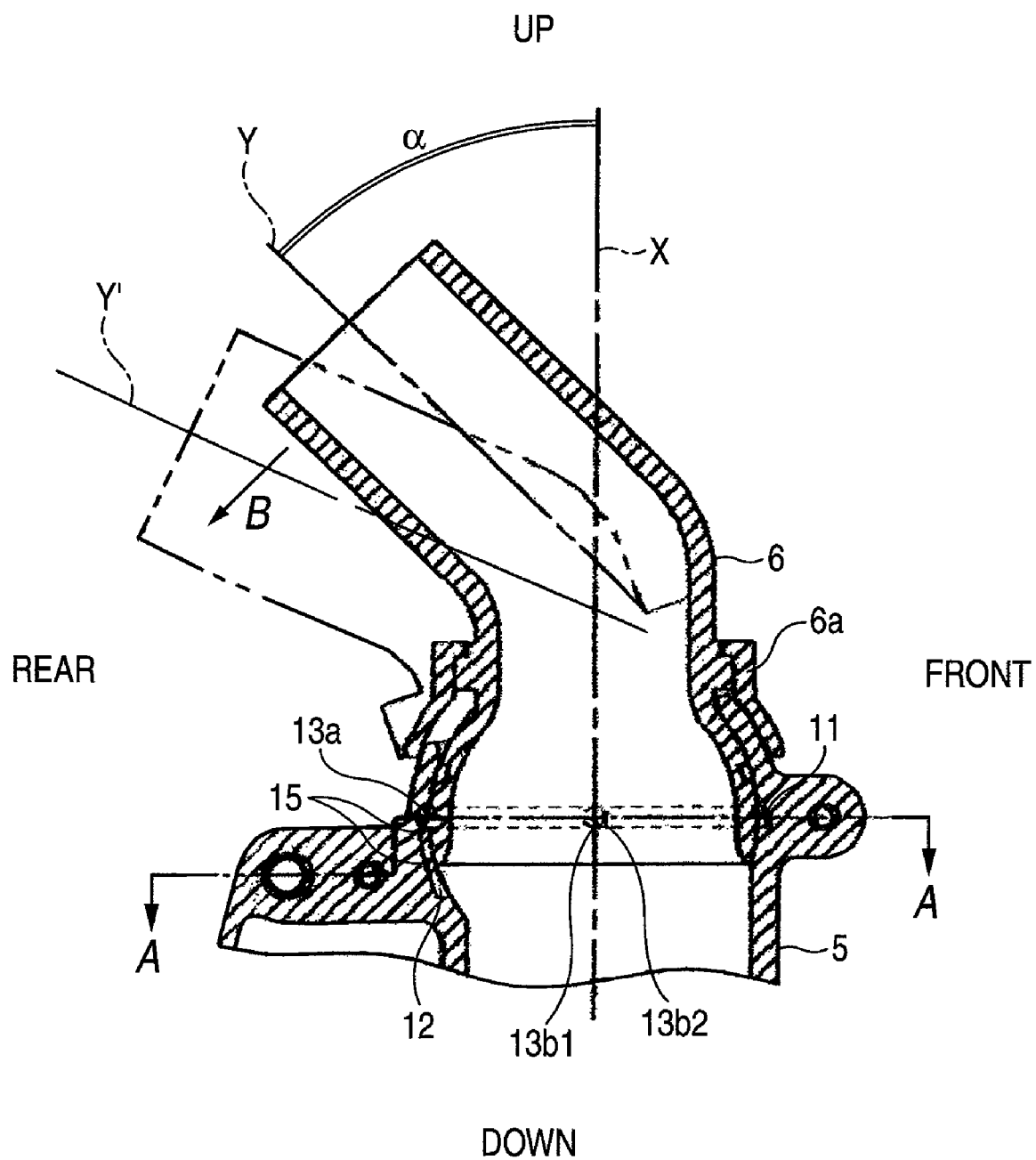
FIG. 2 is a sectional view of a dust nozzle and a saw cover and their neighborhood in FIG. 1.

Here, as shown in FIG. 2, an axis perpendicular to an A-A' sectional view is the fitting axis X of the saw cover 5.

Figure 5:
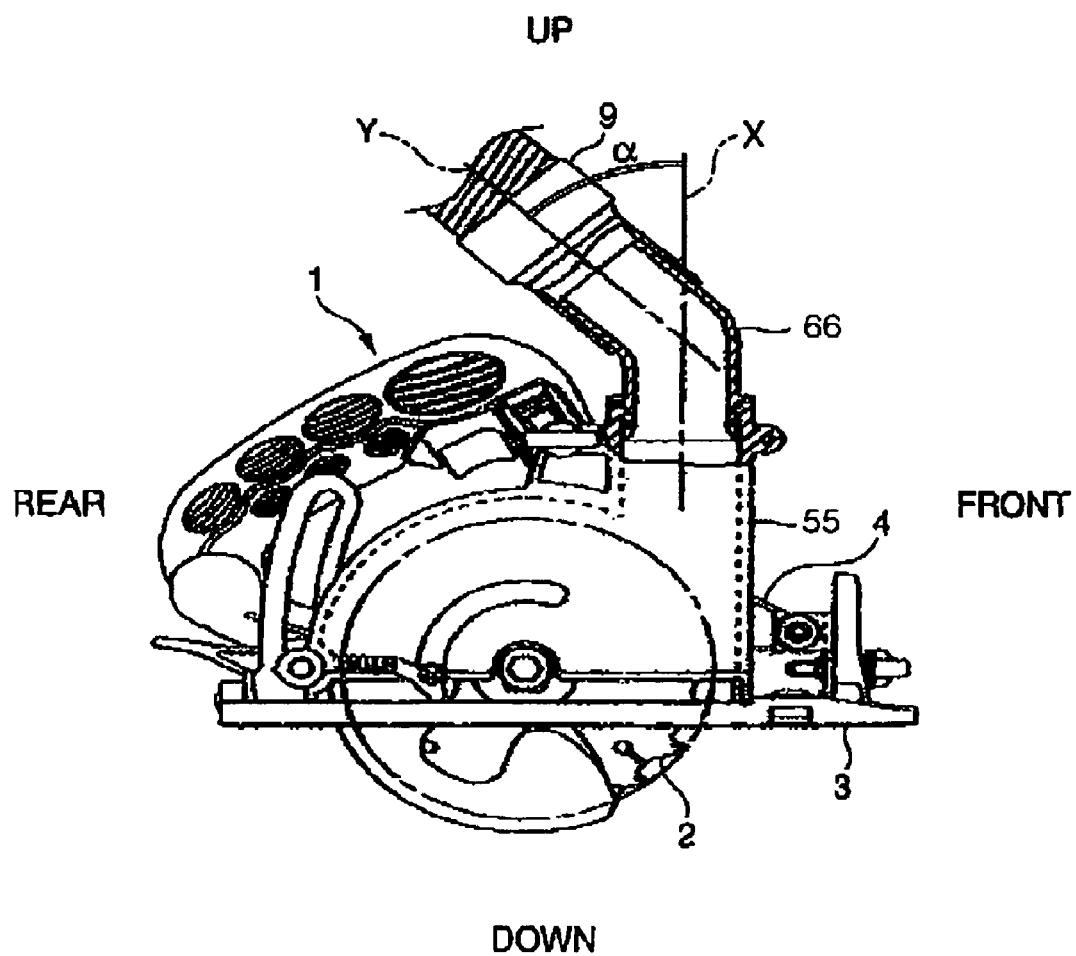
FIG. 5 is a front view of the portable circular saw showing an embodiment in the related art.
Figure 6:
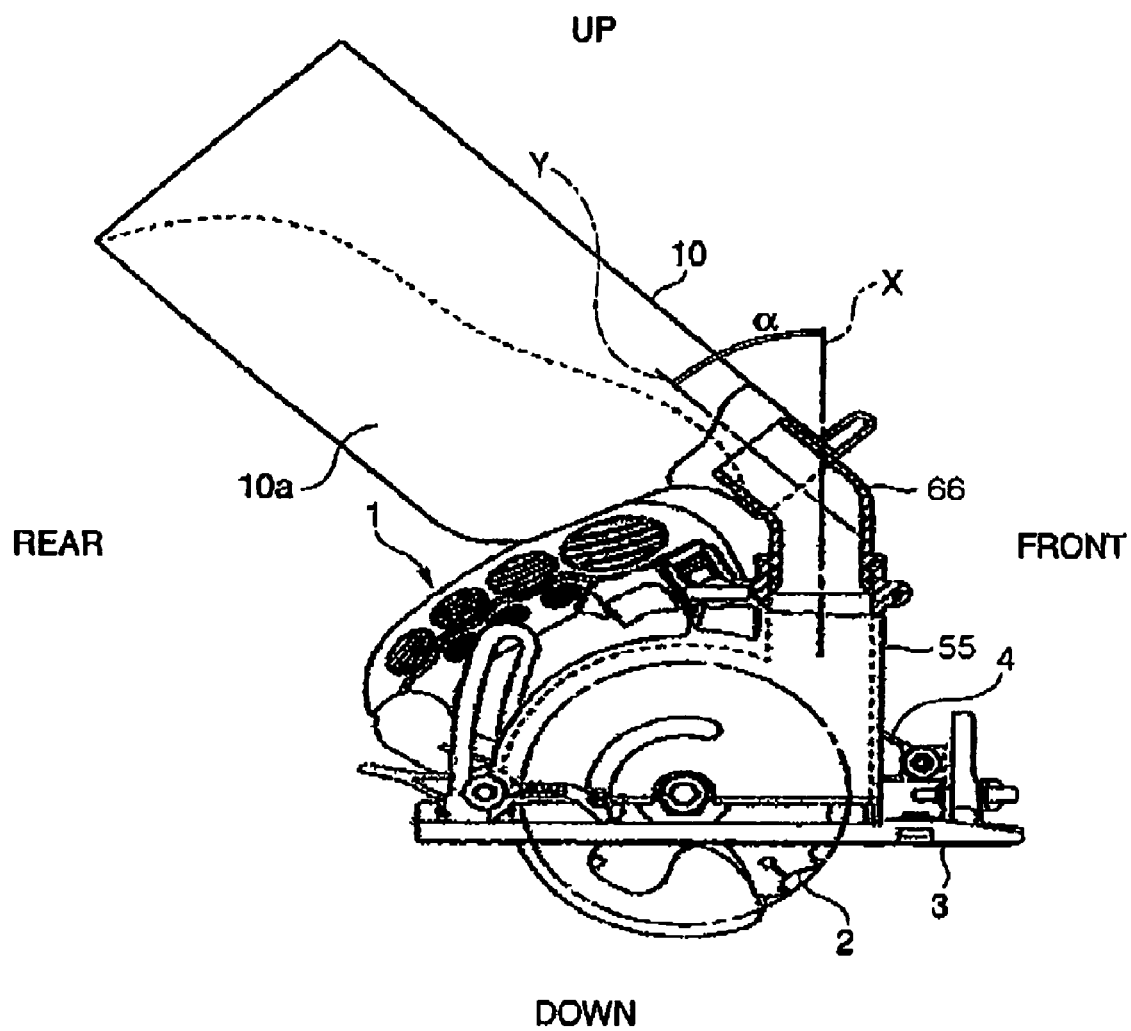
FIG. 6 is another front view of the portable circular saw showing an embodiment in the related art.

Also, as shown in FIG. 5, the fitting axis of the dust bag 9 is the fitting axis Y. Otherwise, as shown in FIG. 6, the fitting axis of the dust bag 10 or the dust hose 9 is the fitting axis Y. Also, the inclined fitting axis of the dust bag 10 or the dust hose 9 is the fitting axis Y'. Here, a first position of the fitting axis of the dust bag 10 or the dust hose 9 when the dust nozzle is not inclined is the fitting axis Y. Also, a second position of the fitting axis of the dust bag 10 or the dust hose 9 when the dust nozzle is inclined is the fitting axis Y'.

Figure 7:
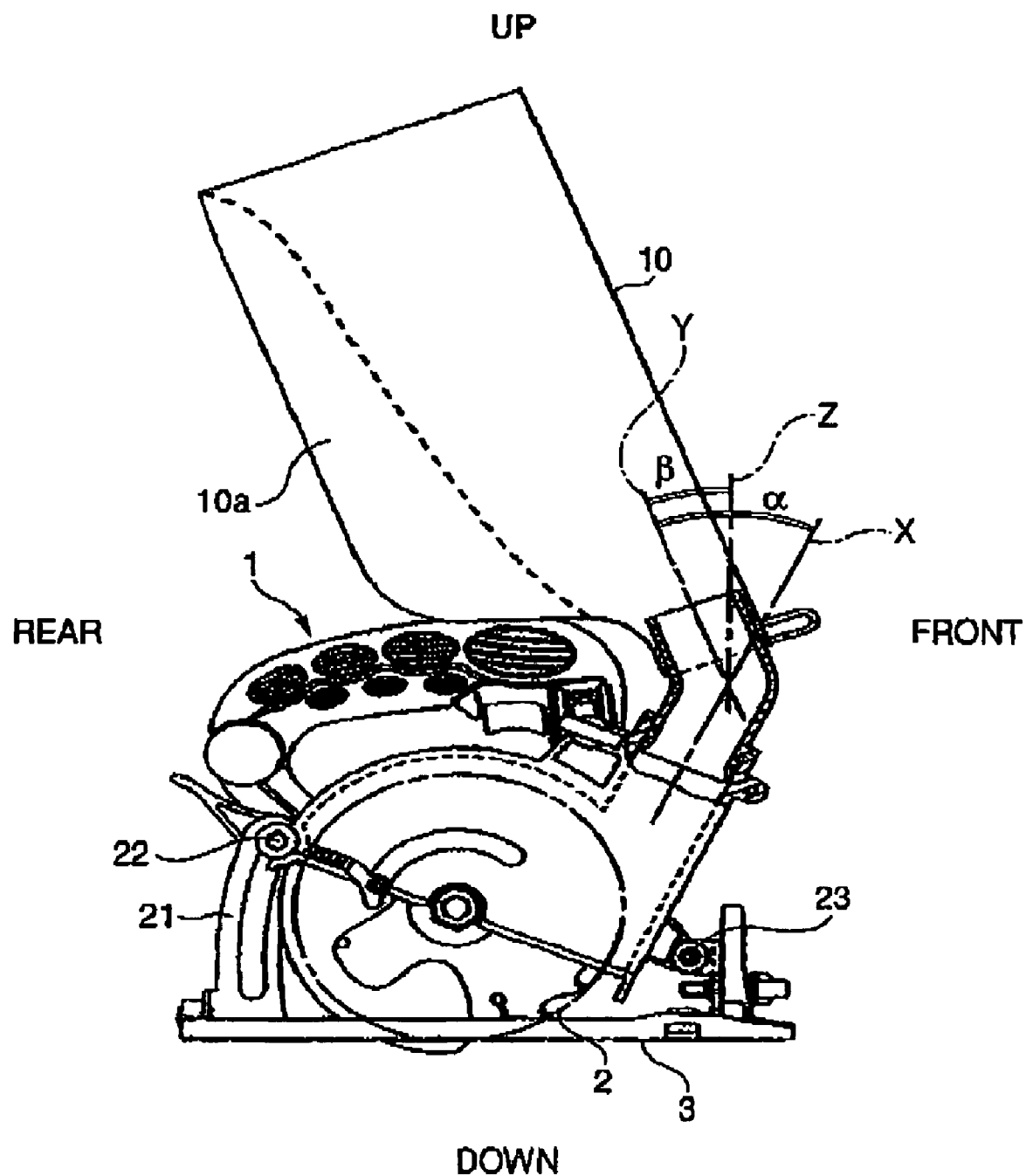
FIG. 7 is a view showing a state that a main body is turned on a turning pivot in the portable circular saw in FIG. 6.

Also, as shown in FIG. 7, an axis in the vertical direction is Z when the fitting axis X of the saw cover 55 does not agree with the axis in the vertical direction.

Here, in FIG. 1 to FIG. 3 and FIG. 5, FIG. 6, X=Z is assumed.

Figure 1:
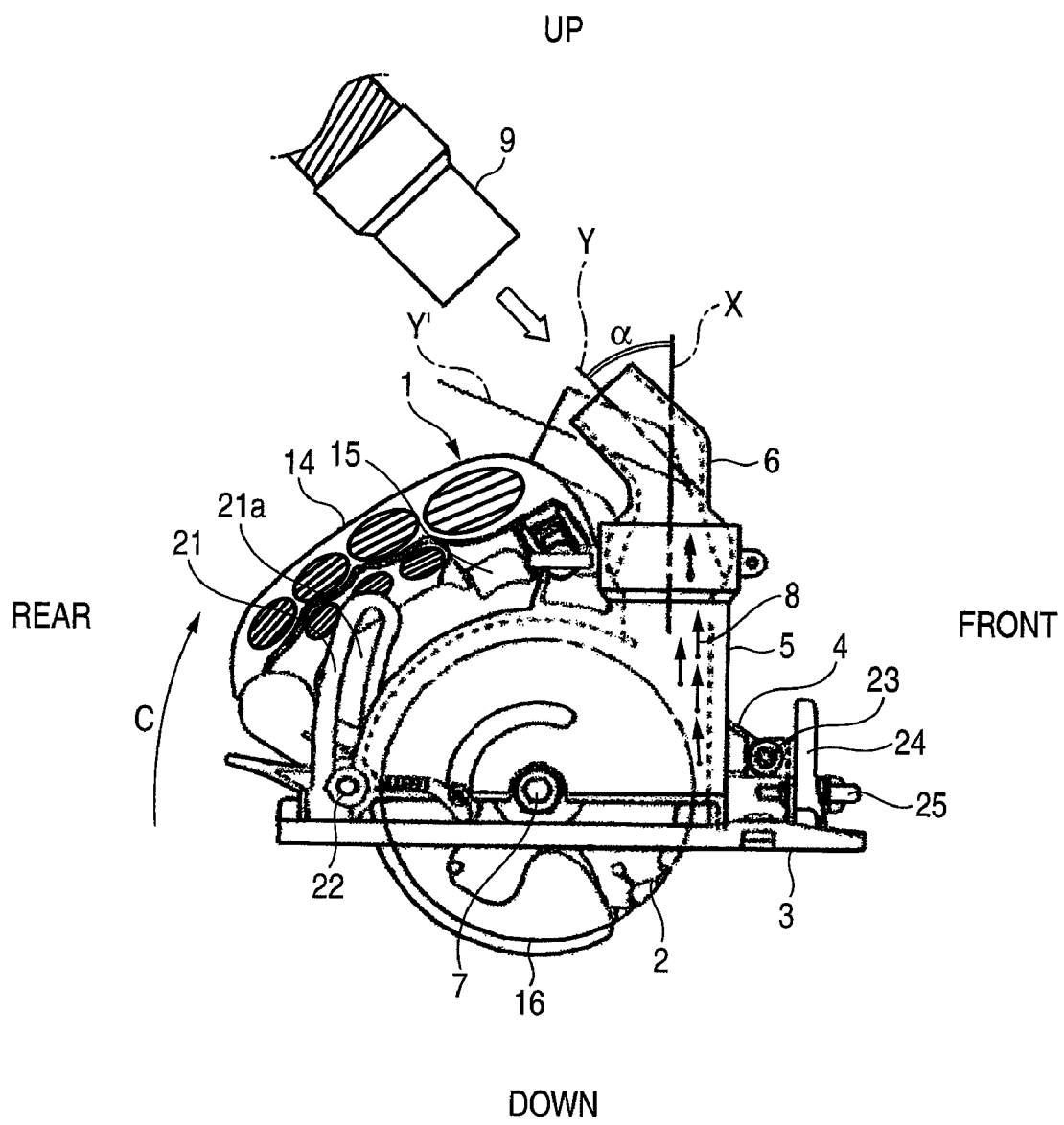
FIG. 1 is a front view of a portable dust collecting circular saw showing an embodiment of the present invention.

FIG. 1 shows a portable dust collecting circular saw according to an embodiment of the present invention. This portable dust collecting circular saw is equipped with the base and the main body 1 that is provided turnably to the base 3.

The main body 1 includes an electric motor (not shown) built in the main body, the saw blade 2 provided to the bottom side of the main body 1 such that it can be rotated by the electric motor, the saw cover 5 shaped to cover partially an outer periphery of the saw blade 2, and a gear cover 4 provided to the main body 1 to cover a side surface of the main body of the saw blade 2 over the base 3. Also, a handle 14 is provided to the gear cover 4, and a switch 15 is provided to the handle 14. Also, the dust nozzle 6 is provided to the saw cover 5. The dust nozzle 6 is provided to the saw cover 5 to communicate the inside of the saw cover with the outside of the saw cover. The dust nozzle 6 can be coupled to the dust hose 9 or the dust bag 10 of the dust collector, or the like to exhaust chips 8 produced by the saw blade 2 to the outside of the saw cover 5. Also, a safety cover 16 is provided as a part of the main body. This safety cover 16 is provided to turn on a saw blade shaft 7 of the saw blade 2 as a turn pivot, while covering partially the saw blade 2.

An electric power is fed from a power feeding unit (not shown). When the worker operates the switch 15, the electric motor is rotated. This rotation is transmitted to the saw blade shaft 7 via a rotation transmitting mechanism (not shown), and rotates/drives the saw blade 2 provided rotatably to the saw blade shaft 7.

As shown in FIG. 1, the main body 1 can be turned on the turn pivot 23 that supports turnably the main body 1 and the base 3. When an engagement between the depth adjusting plate 21 and the turn adjusting knob 22 is disengaged, then the turn adjusting knob 22 is released and turned in the direction indicated with an arrow C, and then the turn adjusting knob 22 is moved in a desired position of the longitudinal hole 21a of the depth adjusting plate 21 and fixed there, an amount of projection of the saw blade 2 from the base 3 can be adjusted (see FIG. 7 about the turning state). Here, FIG. 7 shows a state that an amount of projection of the saw blade 2 from the base 3 is set smallest.

Also, FIG. 1 shows a state that an amount of projection of the saw blade 2 is set largest. The main body 1 is turned with respect to the base 3 by about 20 degree in the cutting direction between a state in FIG. 1 that an amount of projection of the saw blade 2 is set largest and a state in FIG. 7 that an amount of projection of the saw blade 2 from the base 3 is set smallest.

Also, a long hole (not shown) is provided in an inclination plate 24. When an engagement between the inclination plate 24 and an inclination adjusting knob 25 is disengaged to release the inclination adjusting knob 25 and then the inclination adjusting knob 25 is moved in a desired position of the long hole and is engaged with the inclination plate 24 to fix, the main body 1 can be inclined by the inclination plate 24 and the inclination adjusting knob 25 in the direction perpendicular to the longitudinal direction and the vertical direction.

Then, the dust nozzle 6 will be explained hereunder.

As shown in FIG. 1, the fitting axis Y of the dust hose 9 or the dust bag 10 can be inclined.

As a result, when an angle between the axis in the vertical direction and the fitting axis of the dust bag 10 is 0 degree, a storage amount of the chips in the dust bag 10 can be increased.

Also, as shown in FIG. 1, when the fitting axis of the dust bag 10 is inclined backward, an angle between the fitting axis of the dust bag 10 and the axis in the vertical direction is increased. Therefore, a storage amount of chips in the dust bag 10 can be increased.

The dust hose 9 is coupled to the dust nozzle 6, and the chips 8 produced by the saw blade 2 are collected from the saw cover 5 by the dust collector (not shown), or the like through the dust nozzle 6 and the dust hose 9. Also, in the case of the dust bag 10 (not shown), because the dust bag 10 is directly coupled to the dust nozzle 6, the chips 8 are caused to enter into the dust bag 10 by a scattering force by the saw blade.

The inclination in FIG. 1 is shown in detail in FIG. 2. As shown in FIG. 2, both engaging portions of the dust nozzle 6 and the saw cover 5 are formed into a spherical shape. The dust nozzle 6 engages with an inside of the saw cover 5. In order to the overflow of the chips 8 from the saw cover 5 or the dust nozzle 6, a dust nozzle cover 6a for covering the engaging portions is provided to the engaging portions of the saw cover 5 and the dust nozzle 6.

As shown in FIG. 2, a circular groove portion 11 is provided around the entirety of the saw cover 5. Also, a longitudinal groove portion 12 is provided at the back of the saw cover 5. This longitudinal groove portion 12 is formed on the inner surface of the saw cover 5 to have some width in the vertical direction.

Figure 4:
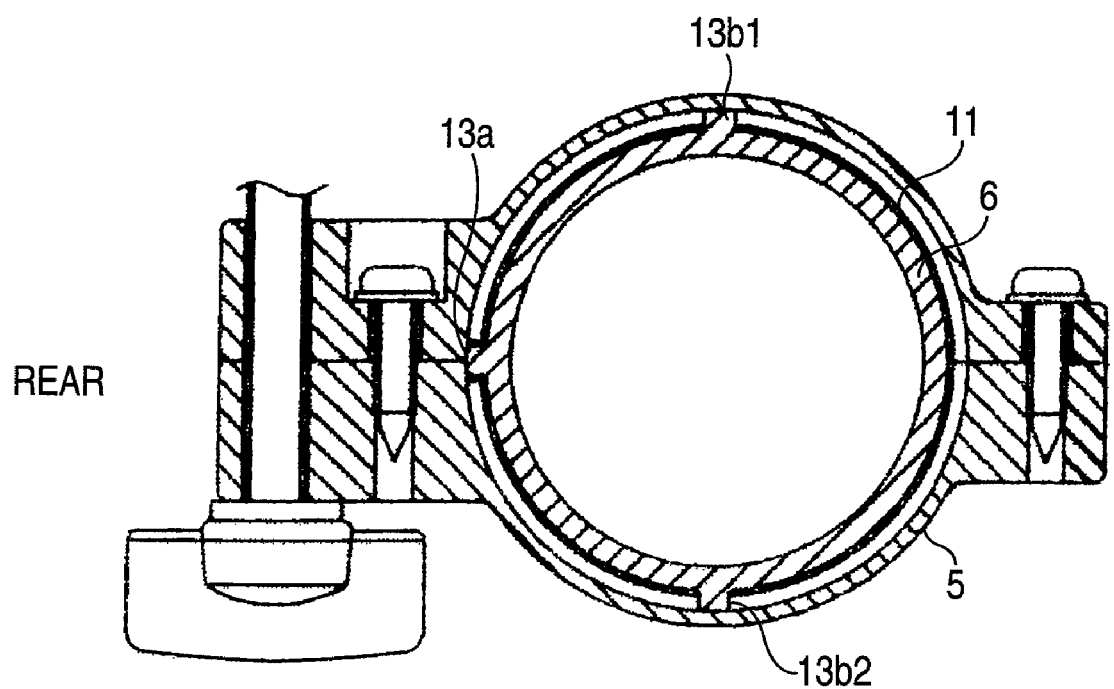
FIG. 4 is a sectional view of the portable dust collecting circular saw taken along an A-A section in FIG. 2.

FIG. 4 is a sectional view of the portable dust collecting circular saw taken along an A-A section in FIG. 2. As shown in FIG. 4, projection portions 13b1, 13b2, 13a fitted in the circular groove portion 11 of the saw cover 5 are provided to the dust nozzle 6. As shown in FIG. 4, the projection portion 13b1 is provided in a position of 0 degree of the dust nozzle 6, the projection portion 13b2 is provided in a position of 180 degree of the dust nozzle 6, the projection portion 13a is provided in a position of 270 degree of the dust nozzle 6. No projection portion is provided in a position of 90 degree of the dust nozzle 6.

When the worker applies an external force to the dust nozzle 6 in an arrow B direction in FIG. 2, such worker can incline the dust nozzle 6.

The dust nozzle 6 can be turned on the projection portions 13b1, 13b2, which act as two pivots, out of three projection portions 13b1, 13b2, 13a. More particularly, as shown in FIG. 2, the projection portions 13b1, 13b2 engage with the circular groove portion 11 provided around the entire periphery, and the projection portion 13a engages with the longitudinal groove portion 12 and then moves along the longitudinal groove portion 12, whereby the dust nozzle 6 can be inclined. At this time, an upper limit and a lower limit of the inclination of the dust nozzle 6 are given when the projection portion 13a comes in touch with an upper end or a lower end of the longitudinal groove portion 12.

Two projection portions 15 are provided to the longitudinal groove portion 12, so that the projection portion 13a can get over the projection portions 15 only when the worker applies an external force in the B direction. Accordingly, it can be suppressed that the inclined dust nozzle returns unexpectedly to its original state. That is, even when any external force is applied unexpectedly to the dust nozzle 6, the inclined dust nozzle does not return to its original state unless a magnitude of such external force is large enough for the dust nozzle to get over the projection portions 15. Also, the worker can easily decide that the projection portion 13a has gotten over the projection portions 15, since such worker has to app;y an external force to cause the projection portion 13a to get over the projection portions 15. Consequently, the workability in inclining the dust nozzle can be improved.

In the present invention, since the projection portion 13a engages with the longitudinal groove portion 12, the dust nozzle 6 cannot be turned in a situation that the dust nozzle 6 is inclined. This is because the longitudinal groove portion 12 is provided only to the rear side. For this reason, even though a force is applied suddenly to the dust bag 10 or the dust hose 9, the dust bag 10 or the dust hose 9 cannot be turned on the fitting axis X of the saw cover 5 as the pivot.

Figure 3:
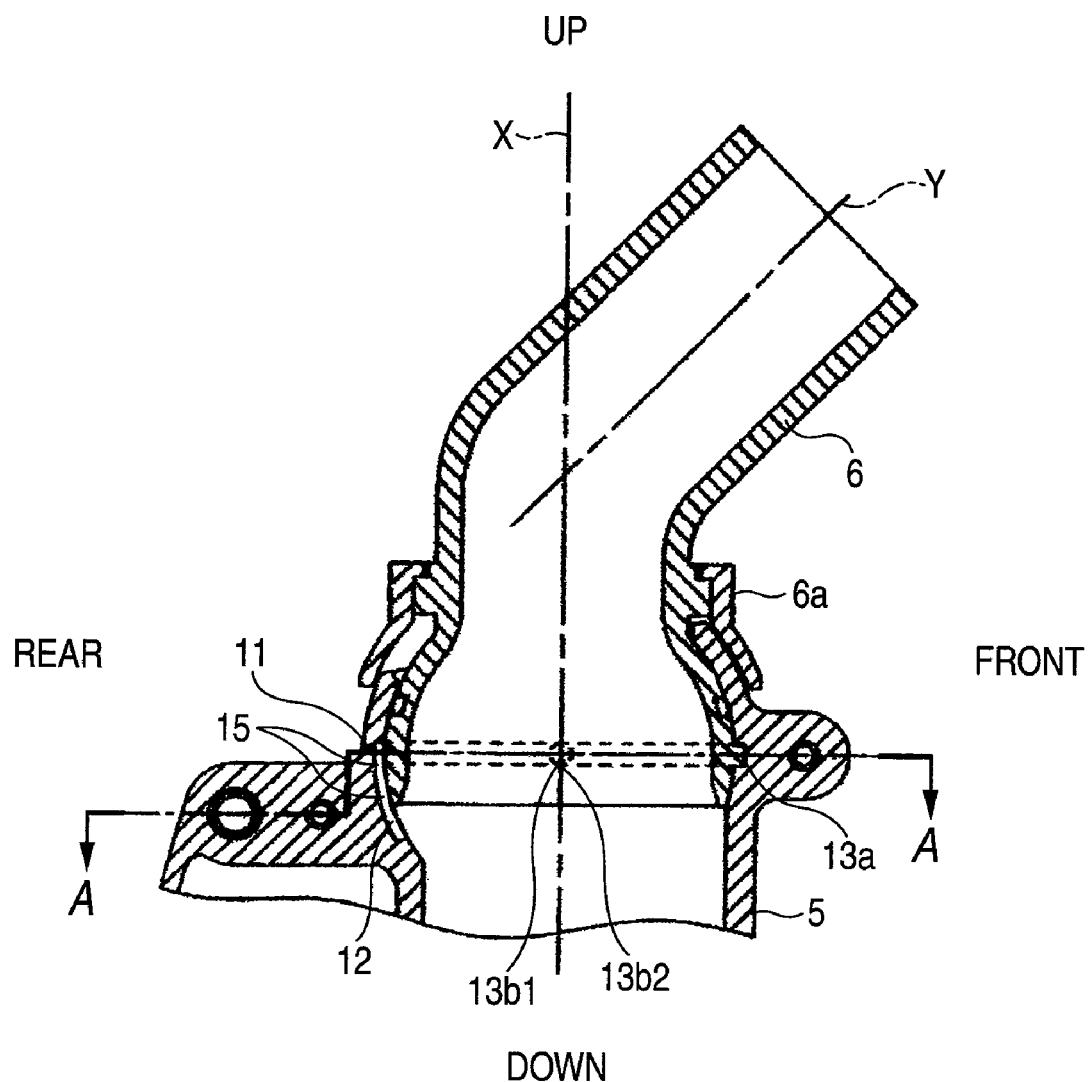
FIG. 3 is a view showing a state that the dust nozzle in FIG. 2 is turned on X as a rotating shaft by 180 degree.

FIG. 3 shows a state that the dust nozzle 6 is turned from the position in FIG. 2 by 180 degree. In this manner, the dust nozzle 6 can be turned on the fitting axis X of the saw cover 5 as the rotating shaft in the vertical direction represented by "up" and "down" in FIG. 2 and FIG. 3. Accordingly, the dust nozzle 6 can be turned around the axis X in the vertical direction up to the worker's desired direction.

Also, the portable circular saw of the present embodiment is constructed such that an amount of projection of the saw blade 2 from the base 3 can be adjusted. When an amount of projection of the saw blade 2 is small, the main body 1 is turned with respect to the base 3 by about 20 degree (see FIG. 7).

Accordingly, a difference arises between an angle β between the dust bag 10 or the fitting axis of the dust bag 10, to which the dust collector is fitted, and the axis in the vertical direction of the dust hose 9 and an angle α between the axis perpendicular to an A-A' section and the fitting axis of the dust bag 10.

This difference is caused when the direction that is perpendicular to an A-A' section and is essentially identical to the vertical direction is deviated from the vertical direction because the main body 1 is inclined from the vertical direction.

As a result, as shown in FIG. 7, a reduction in an amount of chips 8 that can be accumulated in the dust bag 10 is brought about.

When the dust bag 10 and its fitting axis Y are inclined backward in the B-direction in FIG. 2, the reduced angle β between the axis in the vertical direction and the fitting axis of the dust bag 10 can be increased. This is because, as described above, when an angle β between the axis in the vertical direction of the dust nozzle 6 and the dust bag 10 and its fitting axis direction is inclined backward, an angle between the axis Z in the vertical direction and the fitting axis Y of the dust bag 10 is increased. As a result, an amount of chips 8 that can be accumulated in the dust bag 10 can be increased.

Also, the dust nozzle 6 of the portable dust collecting circular saw is placed on the saw cover 5, and the inclined direction of the dust bag 10 and its fitting axis Y are the same as the scattering direction of the chips. Therefore, when the dust bag 10 is turned backward in the direction in which the chips 8 produced by the saw blade 2 are scattered, such dust bag 10 can be inclined further. As a result, a dust collecting efficiency can be enhanced much more.

Here, as described above, the portable dust collecting circular saw is constructed such that the main body 1 can be tilted around the saw blade shaft 7 with respect to the base 3 by the inclination plate 24 and the inclination adjusting knob 25. Therefore, when the dust nozzle 6 is turned in the direction at an angle of 90 degree with the direction B in FIG. 2 and the direction at an angle of 90 degree in FIG. 3 and thus the dust nozzle 6 is inclined, an amount of storage of the chips 8 in the dust bag 10 can be increased.

Also, the worker can position the fitting axis Y of the dust hose 9 and the axis in the vertical direction in preferable positions. That is, upon turning the main body 1 on the turn pivot 23 with respect to the base 3, an angle between the fitting axis of the dust hose 9 and the axis in the vertical direction can be adjusted at about 45 degree.

In the present embodiment, the longitudinal groove portion is provided only on the rear side. In this case, if the longitudinal groove portion is provided over the whole inner periphery of the saw cover 5, the similar advantages can be achieved. In such case, the main body 1 can be inclined not only in the backward direction but also in the whole peripheral direction.

Also, in the present embodiment, the portable circular saw is used as the power tool. In this case, the similar advantages can be achieved by using the grinder, the cutter, or the like if the dust nozzle for collecting the dust is provided. In such case, when the tool in which the dust nozzle 6 is provided on the saw cover and the main body can be turned with respect to the base is employed, the similar advantages can be achieved.

Also, in the present embodiment, an angle between the fitting axis of the saw cover 5 and the fitting axis of the dust bag 10 or the dust hose 9 is set to about 45 degree. If an angle between the fitting axis of the saw cover 5 and the fitting axis of the dust bag 10 or the dust hose 9 is set to 0 degree and both axes are provided coaxially, the similar advantages can be achieved.

Also, in the present embodiment, the inclination of the dust nozzle 6 is given by using the projection portions 13b1, 13b2, 13a that engage with the circular groove portion 11 of the saw cover 5. In this case, the similar advantages can be achieved by any configuration if the configuration can provide the inclination. For example, in the present embodiment, as shown in FIG. 4, the projection portion is provided to the dust nozzle at 0 degree, 180 degree, and 270 degree respectively. But the projection portion may be provided in any positions. Also, for example, if the projection portions may be provided to the saw cover 5 and the longitudinal groove portion may be provided to the dust nozzle, the similar advantages can be achieved.

Also, in the present embodiment, the base that is connected turnably to the main body, has the bottom surface that can be slid on an upper surface of the worked material during the work, and can adjust an amount of projection of the saw blade from the bottom surface by its turning is provided. In this case, the similar advantages can be achieved by any configuration without the base if the configuration that can adjust an amount of projection of the saw blade and can be connected turnably to the main body is employed.

Figure 8:
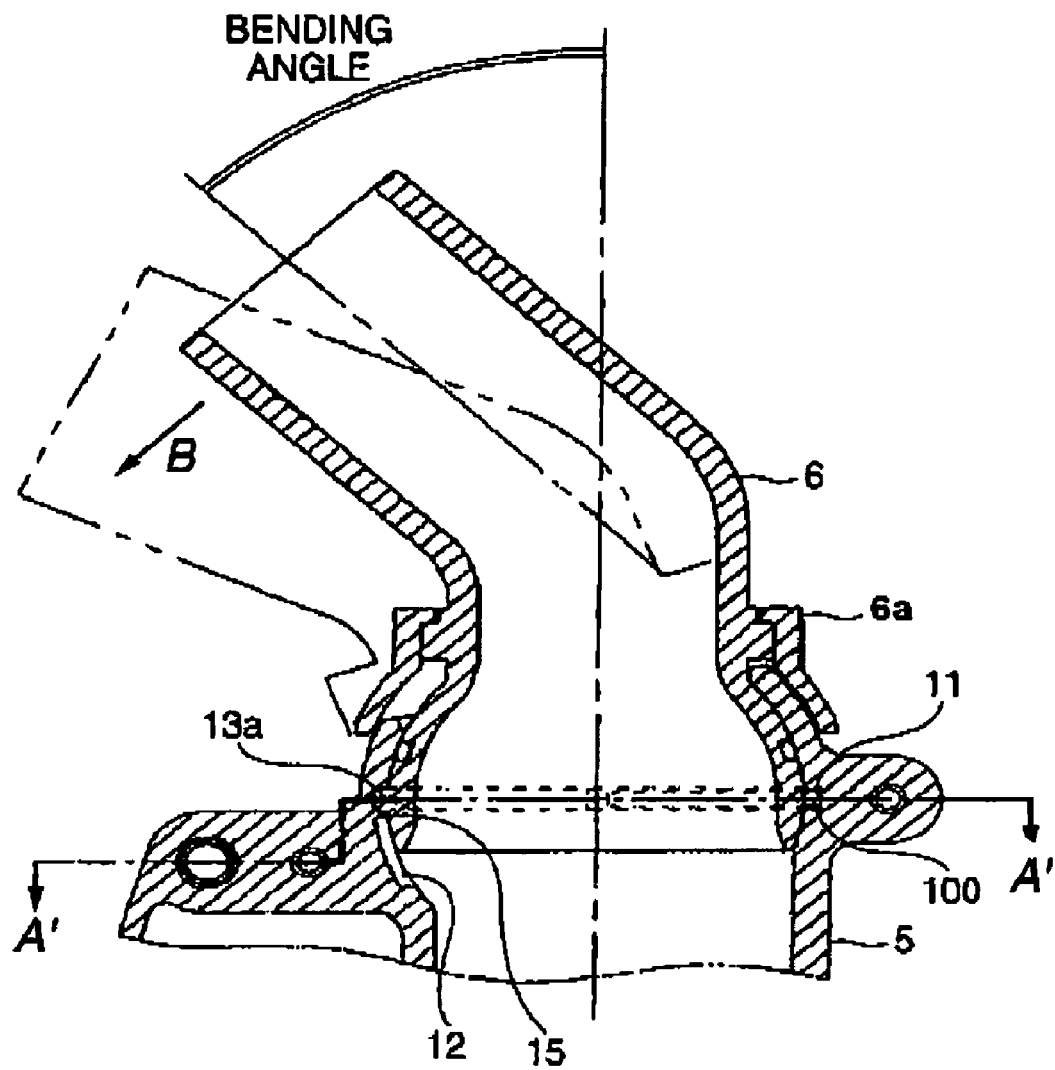
FIG. 8 is a sectional view of a dust nozzle and a saw cover and their neighborhood constituting another embodiment.

FIG. 8 shows a pertinent sectional view of a second embodiment. FIG. 8 is a sectional view of the dust nozzle 6 and the saw cover 5 and their neighborhood of the second embodiment. A fitting member 100 is fitted into the circular groove portion 11.

Figure 9:
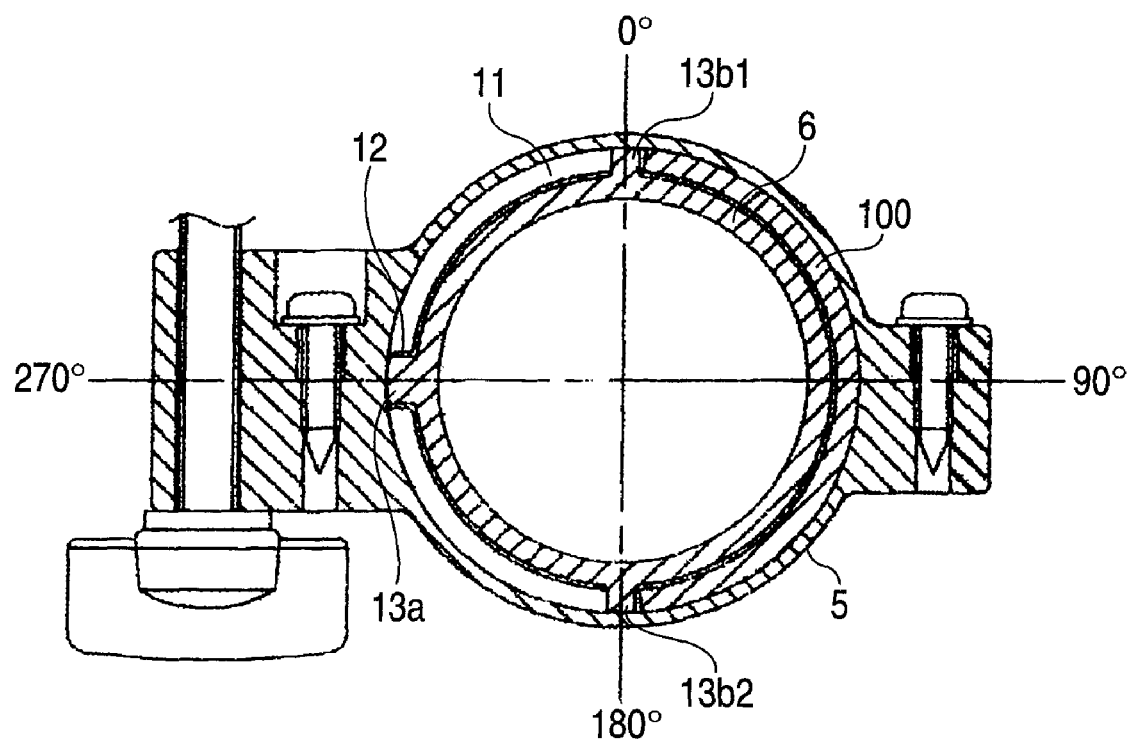
FIG. 9 is a sectional view of a portable dust collecting circular saw taken along an A'-A' section in FIG. 8.

An A'-A' section in FIG. 8 is shown in FIG. 9. The fitting member 100 that is fitted into the circular groove portion 11 substantially from a position of 0 degree to a position of 180 degree is provided. In this case, the fitting member 100 is shaped such that it can be provided between the projection portion 13b1 and the projection portion 13b2. The fitting member 100 is formed of a metal wire member that has an O-shaped sectional shape. Thus, the wire member contacts the circular groove portion 11 via a line contact, and a resistance in sliding the fitting member 100 is reduced.

Because the fitting member 100 comes into contact with the projection portion 13b1 or the projection portion 13b2 when it is turned, the fitting member 100 is slid in the circular groove portion 11.

According to such configuration, the fitting member 100 reduces such a situation that the chips 8 enter into the circular groove portion 11. Therefore, even though the configuration that can turn the dust nozzle 6 and can tilt the dust nozzle 6 in a predetermined position is still employed, it can be prevented that the dust nozzle 6 is difficult to turn.

Figure 10:
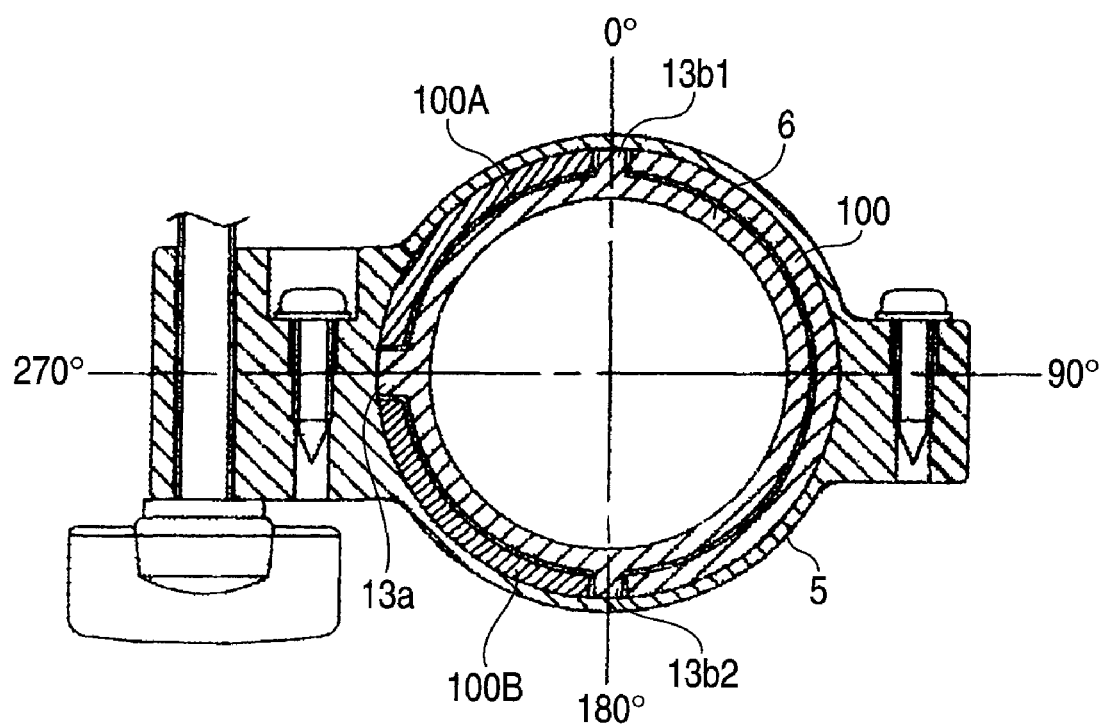
FIG. 10 is a sectional view of a portable dust collecting circular saw constituting still another embodiment.

A pertinent sectional view of a third embodiment is shown in FIG. 10. In addition to the fitting member 100 in FIG. 9, a fitting member 100B is provided to the circular groove portion 11 in a position from 180 degree to 270 degree, and a fitting member 100A is provided to the circular groove portion 11 in a position from 270 degree to 360 degree. In this case, the fitting member 100B is provided between the projection portion 13b2 and the projection portion 13a, the fitting member 100A is provided between the projection portion 13a and the projection portion 13b1.

With this arrangement, it can be suppressed much more than the second embodiment in FIG. 9 that the chips 8 enter into the circular groove portion 11.

In the embodiments of the present invention, the fitting member 100 is provided between the projection portion 13b1 and the projection portion 13b2, and the fitting member 100B is provided between the projection portion 13b2 and the projection portion 13*a* and the fitting member 100A is provided between the projection portion 13*a* and the projection portion 13*b*1. In this case, the configuration in which the fitting members are provided between the projection portions may be employed. Also, even when either of the fitting members 100, 100A, 100B may be employed, the entering of the chips 8 into the circular groove portion 11 can be suppressed and also a reduction of a rotatability of the dust nozzle 6 can be prevented, like the above embodiments.

Also, the projection portion may be provided to the saw cover 5 and the groove portion in which the projection portion is positioned may be provided to the dust nozzle 6. If the configuration in which the fitting member is provided in the groove portion of the dust nozzle 6 is added to the above structure, the entering of the chips 8 into the circular groove portion 11 can be suppressed and also a reduction of a rotatability of the dust nozzle 6 can be prevented, like the above embodiments.

What is claimed is:

1. A power tool, comprising:
    a tip tool driven by an electric motor;
    a main body for supporting the tip tool; and
    a dust nozzle which is provided to the main body and has a connecting portion to which a dust bag or a dust hose is connectable, wherein:
    when the dust nozzle is positioned in a first position, the dust nozzle is rotatable with respect to the main body around a first direction as a rotation center,
    when the dust nozzle is inclined with respect to the first direction from the first position to a second position, the dust nozzle is not rotatable around the first direction, and
    when the dust nozzle is inclined from the first position to the second position, an inclination angle between a center axis of the connecting portion of the dust nozzle and the first direction increases.

2. A power tool according to claim 1, wherein the tip tool is a saw blade that is supported rotatably, the main body has a saw cover that is shaped to cover partially an outer periphery of the saw blade, and the dust nozzle is provided to the saw cover to communicate an inner portion of the saw cover with an outer portion through a hole provided in the saw cover.

3. A power tool according to claim 2, wherein a direction of an inclination of the dust nozzle is set in substantially parallel with a side surface of the saw blade.

4. A power tool according to claim 2, further comprising:
    a base connected turnably to the main body, having a bottom surface that is slid on an upper surface of a worked material during sawing operation, and capable of adjusting an amount of projection of the saw blade from the bottom surface by turning the main body with respect to the base.

5. A power tool according to claim 1, wherein a circular groove portion is provided to the main body, a projection portion fitted in the groove portion is provided to the dust nozzle, a fitting member is fitted in the groove portion, and the projection portion and the fitting member are slid in the groove portion when the dust nozzle is turned.

6. A power tool according to claim 5, wherein the projection portion is provided in plural, and the fitting member is provided at least between two projection portions.

7. A power tool, comprising:
    a tip tool driven by an electric motor;
    a main body for supporting the tip tool, the main body comprising a receiving portion, the receiving portion having an inner or outer surface formed into a partially-spherical shape; and
    a dust nozzle connectable with a dust bag or a dust hose, the dust nozzle comprising a fitting portion and a connecting portion to which the dust bag or the dust hose is connectable, the fitting portion having an outer or inner surface formed into a partially-spherical shape,
    wherein the dust nozzle and the main body are fitted with each other through the fitting portion and the receiving portion, wherein:
    when the dust nozzle is positioned in a first position, the dust nozzle is rotatable with respect to the main body around a first direction as a rotation center,
    when the dust nozzle is inclined with respect to the first direction from the first position to a second position, the dust nozzle is not rotatable around the first direction, and
    when the dust nozzle is inclined from the first position to the second position, an inclination angle between a center axis of the connecting portion of the dust nozzle and the first direction increases.

* * * * *